United States Patent [19]
Webster

[11] Patent Number: 5,248,233
[45] Date of Patent: Sep. 28, 1993

[54] NO-SHOCK SEPARATION MECHANISM

[76] Inventor: Richard G. Webster, 5722 Oxholm St., Long Beach, Calif. 90808

[21] Appl. No.: 951,185

[22] Filed: Sep. 25, 1992

[51] Int. Cl.$^5$ .................. F16B 37/08; F16B 39/36
[52] U.S. Cl. ................... 411/433; 411/267; 411/909
[58] Field of Search ........... 411/266, 267, 270, 432, 411/433, 909, 916, 917

[56] References Cited

U.S. PATENT DOCUMENTS

| | | | |
|---|---|---|---|
| 3,120,149 | 2/1964 | Dickie | 411/433 |
| 3,334,536 | 8/1967 | Armstrong | 411/433 X |
| 4,875,266 | 10/1989 | Batten | 411/433 X |
| 4,929,135 | 5/1990 | DeLarue et al. | 411/267 X |
| 5,160,233 | 11/1992 | McKinnis | 411/433 |

Primary Examiner—Neill R. Wilson
Attorney, Agent, or Firm—Donald D. Mon

[57] ABSTRACT

A retaining mechanism for an externally threaded part or element which can release without exerting a shock load to the structure which it assembles. The retaining mechanism has a spring biased shiftable ring which retains three threaded nut segments by peripheral surface contact on aligned external cylindrical surfaces of the segmented nut. The retained threaded nut segments maintain threaded engagement with a threaded part to form an assembly. The threaded segments are distanced from the assembled structure by a column of Titanium-Nickel shape memory alloy (SMA) material that has been pre-worked to an increased length at a temperature below its transition temperature from face-centered to body-centered structure so that the column will shrink in length upon the application of heat. A heating element is incorporated within or about the SMA column. Preload induced in the assembled threaded part and the assembled structure is relieved by heating of the SMA column which allows the SMA material shrink to its original length thus relieving the preload of the assembled part and structure. The relief of preload in turn allows the spring-biased load retainer ring to move out of engagement with the threaded nut segments. The assembled structure may thereafter gently separate when abrupt separable forces are exerted.

15 Claims, 7 Drawing Sheets

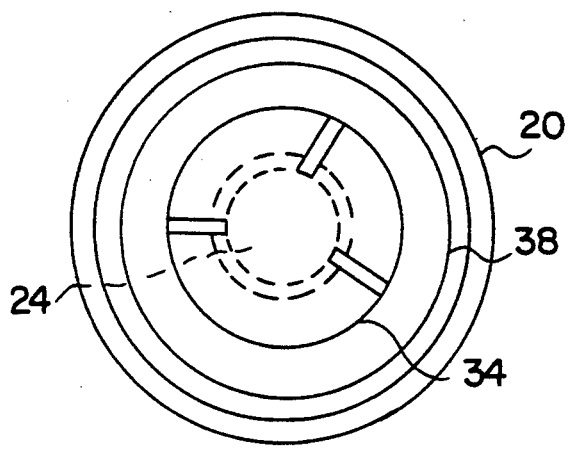
FIG. 3
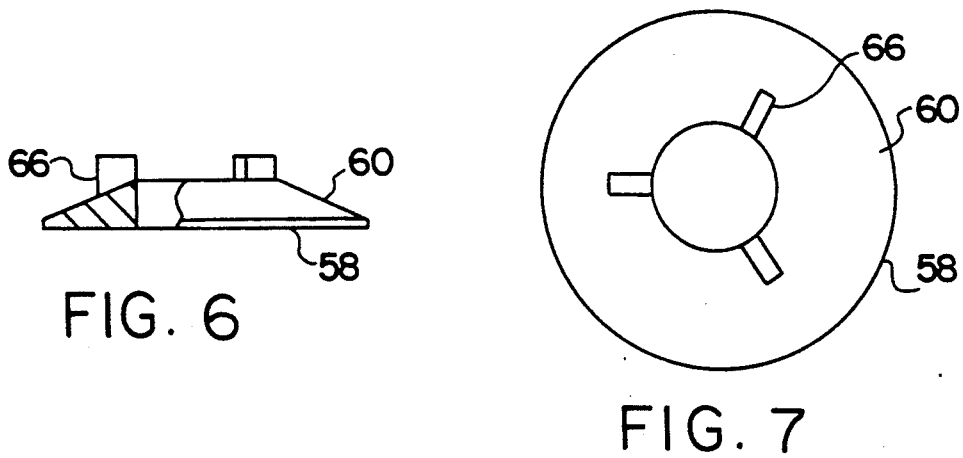
FIG. 6
FIG. 7

NO-SHOCK SEPARATION MECHANISM

FIELD OF THE INVENTION

This invention relates to a separation nut which is separable by fluid forces, and provided with means to reduce separable shock forces on the articles that are assembled by the fastener.

BACKGROUND OF THE INVENTION

This application relates to a separation nut for retaining a bolt or threaded element of structure in assembly with articles of structure which must be separated from other structure without generating a release shock force.

In the field of scientific exploration and experiment there is often a need to separate packages of instrumentation, stages of propulsion units, parts of structure or experiments that are located in remote or hostile environments. Systems to cause the separation often incorporate explosive charges which actually fracture bolt members or use explosive squibs to generate shock and propulsive gases which act to disassemble bolts or studs to which threaded elements are engaged by segmented internally threaded fasteners called segmented nuts.

Bunker U.S. Pat. No. 3,926,090 issued Dec. 16, 1975 is hereby incorporated in its entirety by reference for showing of segmented nuts in a separation nut. Of interest to this subject invention is an article produced by TiNi Alloy Company 1144 65th Street, Unit A, Oakland, Calif., which is called the Frangibolt. This separation device utilizes a frangible bolt in combination with a Shape Memory Alloy spacer (SMA). The SMA spacer is applied directly around the shank of a bolt to fracture the bolt shank through a weakening groove. Application of heat through a circumferential heater to the Shape Memory Alloy spacer increases the length of the spacer to overload the bolt and cause it to fracture along a plane defined by the grooved shank diameter. Fracture of the bolt material under high stresses produces a high shock load due to release of the high induced stress to fracture the bolt. Large shock loads are also produced when an explosive charge is placed within the diameter of a bolt to fracture along a similarly grooved shank. Multipart separation nuts which operate by explosive force can generate shock loads which can include the impact on the assembly housing the released segments, the shearing or other causes of failure of assembly components to release the segments, and the dissipation of the explosive energy due to initiation of a squib or other explosive chemical assembly.

Various schemes have been used for the reduction of release shock which include passive damping by use of cushions, active damping which uses deformable members, increased movement of parts to dissipate energy, and pressurized housings to counteract motion and force. None of the above approaches the problem of relieving the stored strain energy in the bolt or threaded element and the assembled structure over a controlled period of time, thereby reducing the shock load.

SUMMARY OF THE INVENTION

The present invention utilizes internally threaded segments assembled to the external thread of a bolt or threaded part and held in position by a retaining sleeve having a cylindrical internal surface which engages the external cylindrical surfaces of the threaded segments. As load is applied to the bolt or threaded part, radial forces are generated on the sloped thread surfaces which force the segments into high frictional engagement with the retaining sleeve.

The tensile forces in the bolt which are induced by torque on the bolt or on the nut segment assembly is reacted through the segmented nut and the workpiece assembly through a tubular column of metal made from a shape memory alloy (SMA). Shape memory alloys are commonly made of titanium and nickel, and are subject to a phase change transition from a face-centered to a body-centered crystalline internal structure at relatively low temperatures. The shape memory alloy member must be elongated physically about ten percent while it is at a temperature that is below the transition phase temperature of the alloy. When the temperature of the SMA member is raised to its transition level, the member will shrink to its original length due to the phase change. A commonly available material is called Nitinol. The SMA material member carries the tension load between the segmented nut of this invention and the workpiece, as generated by the pre-stressing of the assembled bolt. To initiate the disassembly of the joint, a heater is energized around the SMA member to heat the SMA member to the transition temperature. When the SMA alloy is thus heated, it shrinks to relieve the preload on the bolt and on the engaged threaded segmented nut and subsequently spring members push the retaining sleeve out of engagement with the threaded segments and the assembly is free to separate by its own weight, by the urging of external forces on the structure or by the application of spring members to the threaded segment members, or even of explosive forces.

However, an object of this invention is to eliminate the necessity for explosive force to provide separation of a bolted assembly and therefore to prevent shock to an assembled structure, rather than merely to reduce it.

A further object of the invention is to provide a lightweight separation assembly for use in separable structure.

A further object of the invention is to provide for separation of an assembly without the use of frangible parts that can loose damaging forces to the assembled structure.

A further object of this invention is to provide for a timed release of the assembly by the calibrated heating of the SMA release member.

The above and other features of this invention will be fully understood from the following detailed description and the accompanying drawings, in which:

DESCRIPTION OF THE DRAWINGS

FIG. 3 is a cross section taken on line 3—3 of the embodiment of FIG. 1;

FIG. 6 is a side elevation partially in cross-section of one component of the embodiment of FIG. 1;

FIG. 7 is a plan view of the component of FIG. 6;

DETAILED DESCRIPTION OF THE INVENTION

Figure 1:
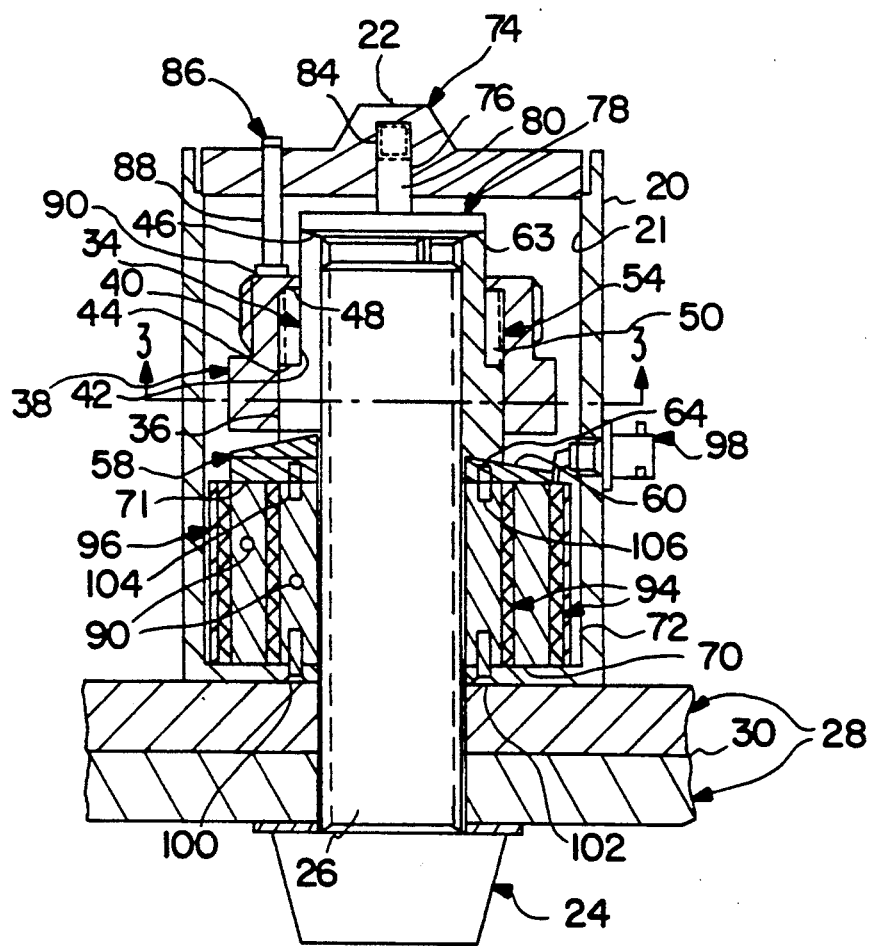
FIG. 1 is a side elevation partly in cross-section showing the presently preferred embodiment of the invention.

FIG. 1 shows the preferred embodiment of the invention in assembly with a tension bolt and structure intended for separation.

In FIG. 1, a case body member 20 of tubular construction has an internal cylindrical cavity 21 with a longitudinal axis 22 around which the various components of the embodiment are disposed. A tension bolt 24 has a shank 26 which passes through structure 28. The structure has a separation plane at 30. Internally threaded segmented nut 34 has a first end face 63 and a second end face 64, and assembles on external threads of threaded shank 26 of the bolt 24 to form a virtually continuous nut assembly with said threaded shank 26. The segmented nut 34 has a smooth cylindrical external surface 36, interrupted only where the segments adjoin one another.

A load ring 38 engages with the cylindrical surface 36 of segmented nut 34 utilizing its internal cylindrical surface 40. The segmented nut 34 has a reduced cylindrical diameter 42 which forms a shoulder 44, and extends to the free end 46 which is not engaged with bolt 24. The internal cylindrical surface 40 of the load ring 38 has a shoulder 48 at one end which forms a loose sliding fit on reduced cylindrical diameter 42. The reduced cylindrical diameter 42 of the thread segmented nut 34 forms a chamber 50 between the load ring 38 and the cylindrical reduced diameter 42 of the segmented nut 34. A compression spring 54 is contained within the cylindrical chamber 50.

Key seat washer 58 has a conical surface 60 which engages a conical surface at the bolt engaging second end face 64 of the segmented nut 34. Upstanding keys 66, as can be seen in FIG. 6 in a detail of key seat washer 58, act to help assemble and space the segmented nut 34.

The body member 20 is of cylindrical semi-tubular structure to contain all parts of the separation mechanism within its interior cylindrical surface 72. A cap 74 closes off the open end of body member 20. The cap 74 is threadably engaged with the body member 20 and the cap 74 has a cylindrical chamber 76 formed coaxially with the longitudinal axis 22 of the case body 20. A separator shaft 78 has an actuating shank 80 coaxial with the longitudinal axis 22 and is adapted to fit slidably in cylindrical chamber 76. Separator shaft 78 has a conical head 82 which engages a similar conical face at the first end 46 of the segmented nut 34.

A compression spring 84 is contained within chamber 76 of the cap member 74 between the closed end of chamber 76 and the end of actuating shaft 80. An indicator pin 86 has a shaft 88 which is slidably engaged through cap member 74 and has a head end 90 which contacts load ring 38. A transition load member in the form of a tubular spacer 94 is made of a shape memory alloy, of which Nitinol is a commercially available brand name, has the bolt 24 passed therethrough for assembly. The spacer 94 has a first flat end 70 and a second flat end 71. The shape memory alloy is of titanium-nickel composition and has been preworked by rolling or stretching at a temperature lower than its transition temperature to elongate the material at least enough to relieve the pre-tension of the bolt 24 by shrinkage when heat is applied to raise the shape memory alloy to its transition temperature. The material, such as Nitinol, can be stretched for pre-deformation up to about 10% of its length. Typically, the calculated elongation of a bolt under load is shown in Table I below.

Reviewing the small elongations in a bolt under tension, it is only necessary to deform the Nitinol a very small percentage to achieve the relief of preload tension in the bolt.

Tubular insulation 96 surrounds the shape memory alloy column 90. Embedded in the SMA column 90 are electrical heaters 94. An electrical connector 96 provides electrical energy to the heaters 94. Pins 100 and 102 locate the shape memory column 90 in the body member 20, and pins 104 and 106 locate the key seat washer 58 with respect to the shape memory column 90 within the body member 20.

TABLE I

CALCULATED ELONGATION OF BOLT UNDER LOAD
Assumes Elasticity of $3.0 \times 10^6$ psi
Typical Structure Compression is 2 to 3 Times Bolt Elongation

| Bolt Dia | Bolt Length | Elongation |
|---|---|---|
| .250" | .500 | .0014" |
| .375" | .750 | .0016" |
| .500" | 1.000 | .003" |
| .625" | 1.250 | .003" |
| .750" | 1.500 | .003" |
| .875" | 1.750 | .004" |
| 1.250" | 2.500 | .006" |

Figure 2:
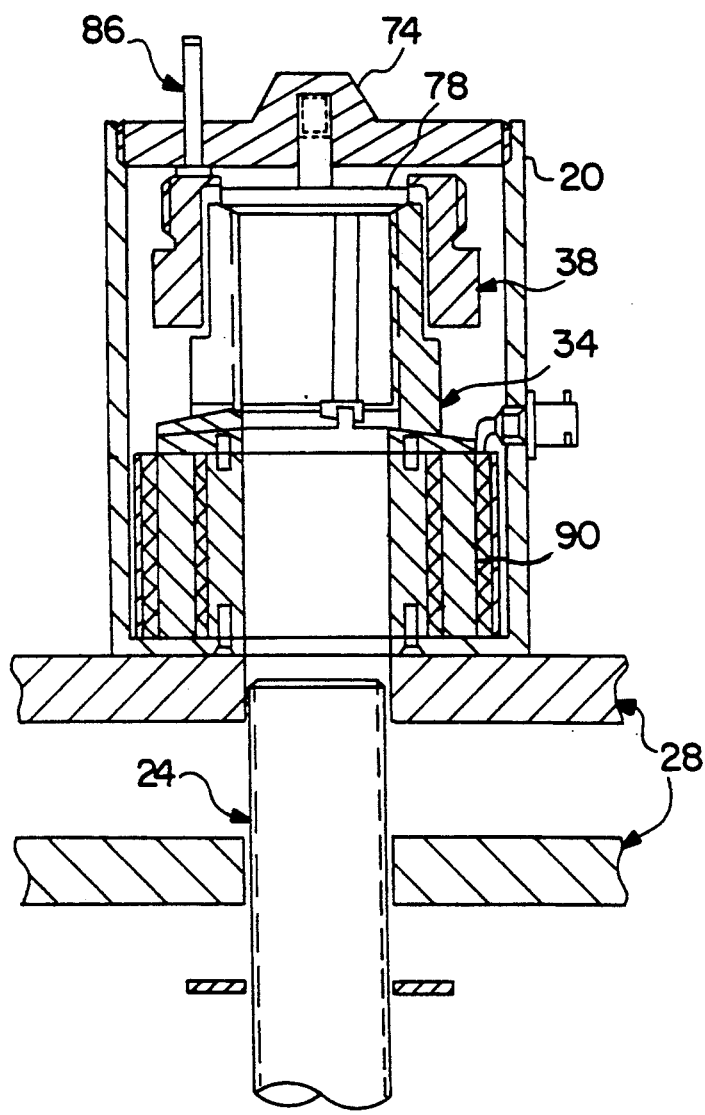
FIG. 2 is a side elevation, partially in cross section showing the embodiment of FIG. 1 after actuation.

FIG. 2 shows the relative position of the embodiment of FIG. 1 parts after actuation by applying heat to the shape memory column 90. Column 90 shrinks in length relieving the pre-tension load on the bolt 24. As soon as the pre-tension is released, the segmented nut 34 does not exert axial force on the load ring 38 so the load ring 38 is pushed by the compression spring 54 out of engagement with the segmented nut 34. Threaded segments of segmented nut 34 are then pushed outward by the separator member 78 and also react with the key seat washer 58 as a result of the thrust of the separator 78 to push outwards and release the bolt 24, leaving the structure 28 free to separate on separation plane 30. In moving out of engagement the load ring 38 contacts the indicator pin 86 and pushes it outward through the cap 74 to indicate completion of the separation. The indicator pin 86 is also used as an inspection and positioning device to assure that the load ring 38 is correctly assembled with the threaded segments 34.

The speed of actuation may be regulated by the electrical energy supplied to the heaters 94 which raise the temperature of the shape memory alloy column 90.

Figure 11:
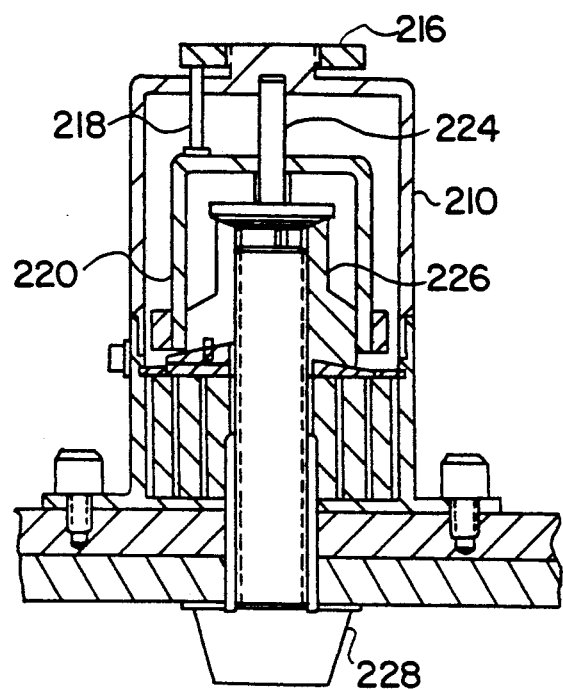
FIG. 11 is a side elevation partially in cross-section of an alternate embodiment of the embodiment of FIG. 1.
Figure 12:
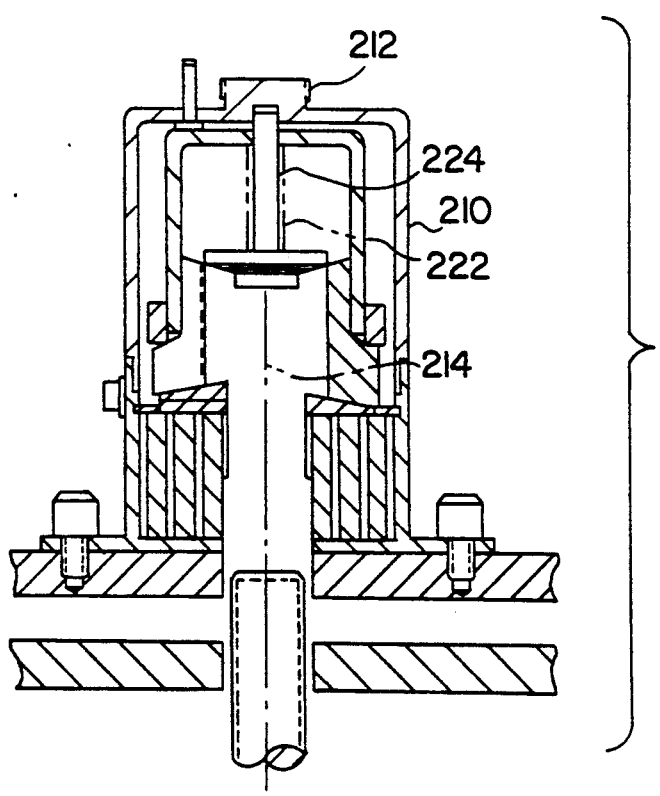
FIG. 12 is a side elevation partially in cross-section of the embodiment of FIG. 11 after actuation.

As an alternative design to the embodiment of FIGS. 1 and 2, there is shown in FIGS. 11 and 12 a body member 210 having a threaded boss 212 co-axial with longitudinal axis 214. Threadably mounted to boss 212 is a retainer plate 216 which extends radially to contact indicator pin 218 in position when load ring 220 is in assembled position. The retainer plate 216 must be removed before the device can be placed in service for actuation.

A further alternative structure in to the embodiment of FIGS. 1 and 2 as shown in FIGS. 11 and 12 is the compression spring 222 which is positioned around separator shaft 224 and acts between load ring 220 and separator shaft 224 to shift load ring 220 out of engagement with segmented nut 226 when the pre-tensile load on bolt 228 is released as here-in-before described for the embodiment of FIGS. 1 and 2.

Figure 8:
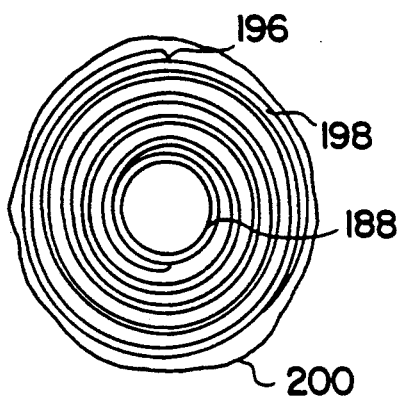
FIG. 8 is a plan view of a component of the embodiments of FIG. 1 and FIG. 11.
Figure 9:
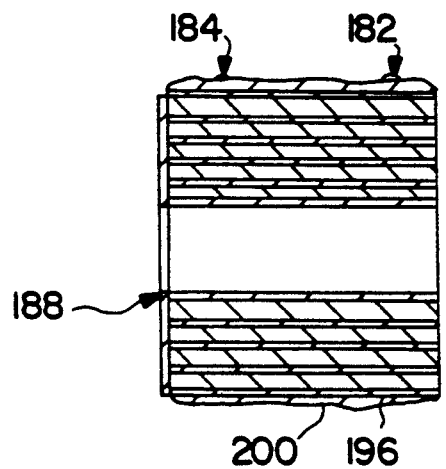
FIG. 9 is a side elevation in cross-section of the component of FIG. 8.
Figure 10:
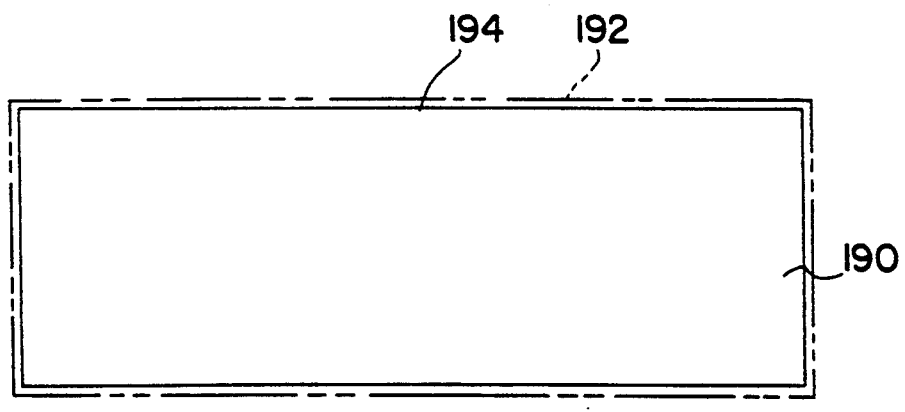
FIG. 10 is a plan view of a portion, in process, of the component of FIG. 8.

The tubular spacer 94 of FIG. 1 is made of alternating cylinders of the SMA material and heating element material but as an alternative convenient structure shown in FIGS. 8, 9, and 10, a flat sheet 190 of SMA material may be rolled to reduce its thickness and increase its width and length as indicated by phantom line 192 and solid line 194. This process is performed at a temperature below the transition temperature of the SMA material. The flat sheet 190 is then rolled into a SMA spiral 196, as shown in FIG. 8, with a sheet of heater element 198 enveloped in the spiral. Insulating material 200 encloses the spiral assembly.

A cylindrical surface 188 is formed co-axial with the spiral 196 to provide passage for bolt 228 of FIG. 11. Electrical leads 182 and 184 furnish energy to the heating element 198 to actuate the release of the device.

Figure 4:
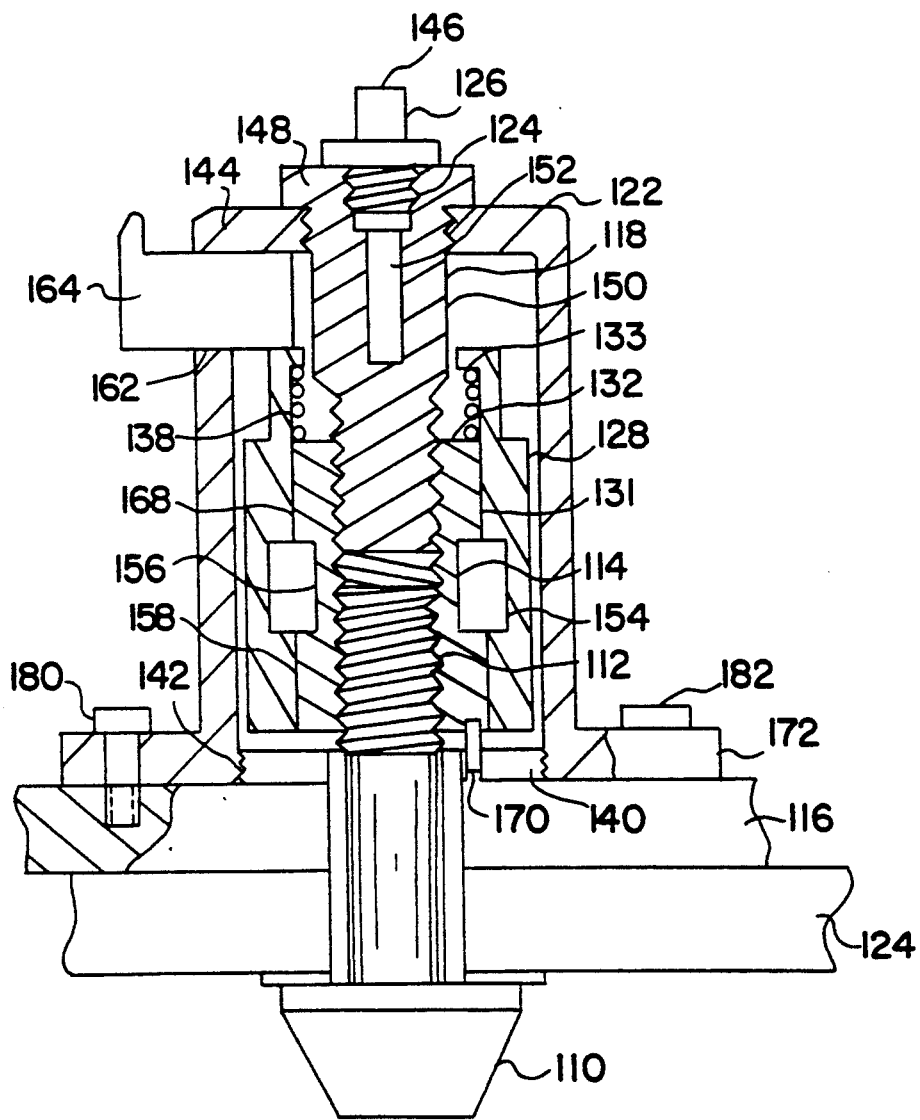
FIG. 4 is side elevation partially in cross-section of another embodiment of the invention.

A second embodiment of the invention is shown in FIG. 4, where a threaded tension bolt 110 has its threaded end 112 engaged by segmented nut 114. The segmented nut 114 is of sufficient length to engage a threaded stud 118 at the end opposite from the tension bolt 110 engagement. The threaded stud 118 is made of a shape memory alloy (SMA) such as Nitinol and must be shortened by means of compression working while at a temperature below the transition temperature of the material, and to a sufficient distance to overcome both the lengthening of the tension bolt due to pre-load tensioning by applied torque process, that is a part of the assembly and any tension lengthening due to the reaction within the SMA stud due to the tension applied to the structure through the tension bolt 110. The segmented nut 114 is contained by the smooth cylindrical inside diameter surface 130 of load ring 128.

Load ring 128 fully contains the segmented nut 114 and has additional length beyond the segments by means of which internal cylindrical surface 131 protrudes beyond the segment face 132 to where it terminates at a shoulder 133. The retract spring 138 is contained between the segment face 132 and the shoulder 133 of the load ring 128. A tubular case body 122 contains the entire mechanism for separation of this invention. At the end remote from the workpiece 116, the case is closed. SMA stud member 118 is semi-tubular for the distance through the non-threaded shank portion 150. An electrically actuated squib 126 is threadably attached to head 148 of SMA stud member 118 and is adapted to discharge heating gases or other byproducts of chemical action into chamber 152. Load ring 128 is provided with a cylindrical surface undercut 154 of sufficient diameter and length to admit cylindrical shoulder 131 of the segmented nut 114 for clearance when the nut segments are separated from the screw threads of the SMA stud 118 and tension bolt 110. Similarly, segmented nut 114 is provided with cylindrical surface 156 of decreased diameter and sufficient length to admit shoulder 158 of load ring 128 for expansion of the segmented nut 114 during separation.

A port 162 is provided through case body 122 to open a passage to internal cylindrical surface 142 of the case body 122. A key 164 may be inserted through port 162 to hold load ring 128 against compression retract spring 138 until tension bolt 110 is prestressed into the assembly. Segmented nut 114 generates an axial load which will generate radial loads through screw-thread interaction to frictionally engage the cylindrical external surface 168 of nut segments 114 with the internal cylindrical surface 131 of load ring 128, thus holding the assembly stable. Key 164 must be removed before the structure is placed in service for future separation.

A flange 172 is formed on case 122. Case 122 is assembled to workpiece 116 with bolts 180 and 182 help in the assembly process. Pins 170 engage each nut segment 114 with end plate 140 to prevent rotation of the nut segment 114 during application of torque to tension bolt 110.

Figure 5:
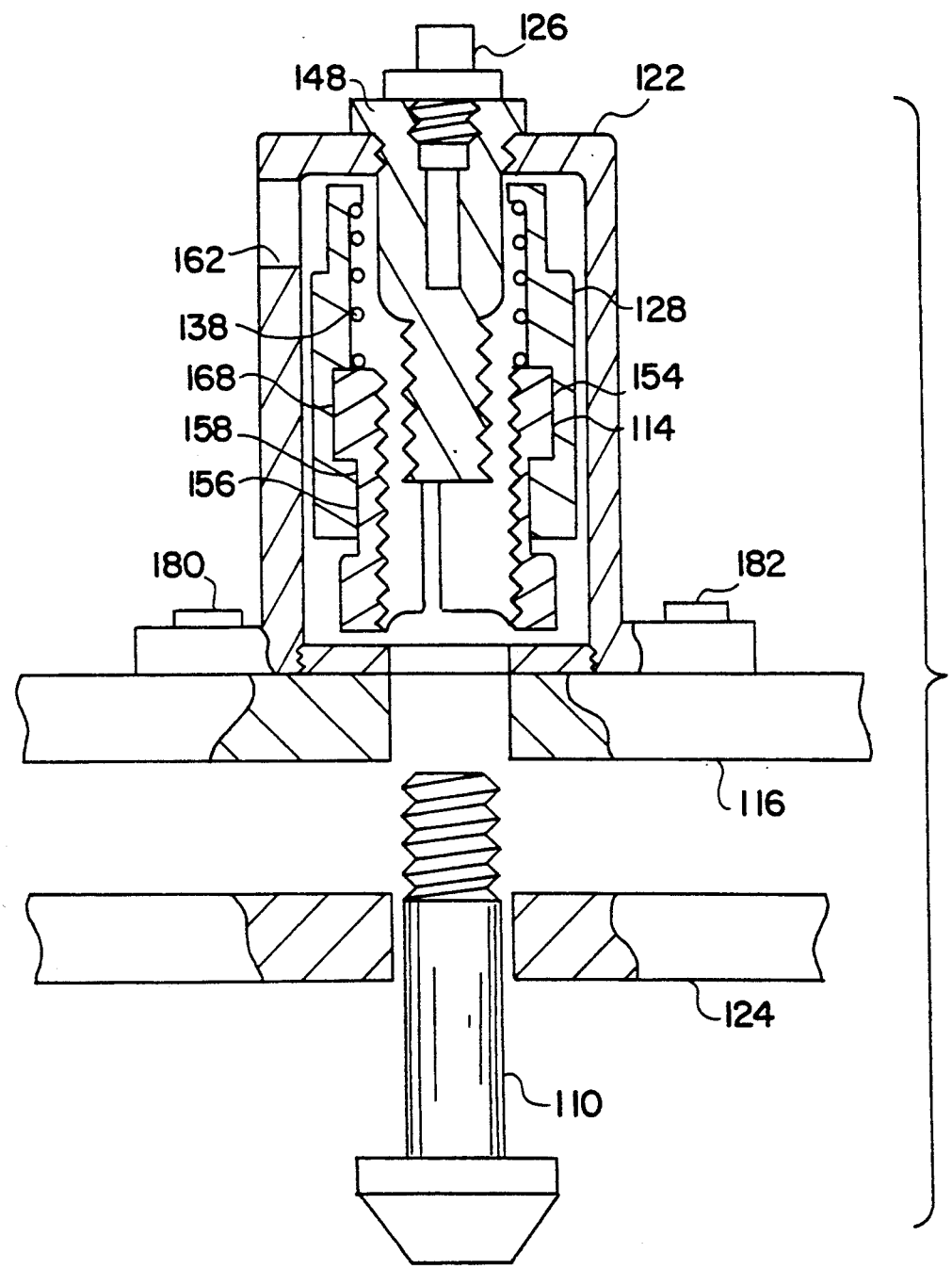
FIG. 5 is a side elevation partially in cross section of the embodiment in FIG. 4 after actuation.

During the separation function, as can be seen in FIG. 5, the SMA stud 118 will be heated by the firing of the electrically actuated squib 126. The heating of the SMA stud 118 to a temperature above its transition temperature causes the SMA material to expand to its original length thus lengthening the SMA stud and relieving the tensile load that was imposed on the structure and the tension bolt 110. When the tensile preload is relieved the diametral force holding the thread segments 114 in engagement with the load ring 128 diminishes to zero and the load ring is retracted by retract spring 138. This allows the segmented nut 114 to spring outwardly from engagement with both the tension bolt 110 and the thread SMA stud member 118, thus permitting the structure to separate at the separation plane between structural workpieces 116 and 124.

This invention is not to be limited by the embodiments shown in the drawings and described in the description, which are given by way of example, and not of limitation, but only in accordance with the scope of the appended claims.

I claim:

1. A separation nut for releasably engaging a threaded element for separation of an assembly of structural members along an axis comprising:
   a) a segmented nut member, said segmented nut member having a first end and a second end, and a first end face and a second end face; said segmented nut member having an external cylindrical surface; said segmented nut member having internal screw thread means adapted to engage a threaded element at said second end;
   b) a load ring member, said load ring member having an inside cylindrical surface adapted to slidably fit in engagement with said external cylindrical surface of said segmented nut member;
   c) a transition load member, said transition load member having a first end and a second end, said transition load member made of a shape memory alloy formulated to change its internal structure at a transition temperature, said transition load member having been processed below the transition temperature physically to change the axial length between said first end and said second end.
   d) heater means, said heater means adapted to heat said spacer member to said transition temperature;
   e) spring means, said spring means disposed on said load ring member, said spring means being adapted to move said load ring member out of engagement with said segmented nut;
   whereby said transition load member is adapted to be assembled between said segmented nut and said structure members using said threaded element and whereby a pre-tension load is applied to said threaded element and said structure members for assembly, and whereby said load ring member is frictionally held by component thread forces in engagement with said segmented nut, whereby heating said transition load member to said transition temperature changes the length of said transition load member, whereby pre-tension load is relieved, and whereby said spring means moves said load ring out of assembly with said segmented nut.

2. A separation nut for releasably engaging a threaded element for separation of an assembly of structural members along an axis comprising:
 a) a segmented nut member, said segmented nut member having a first end and a second end, and a first end face and a second end face; said segmented nut member having an external cylindrical surface; said segmented nut member having internal screw thread means adapted to engage a threaded element at said second end;
 b) a load ring member, said load ring member having an inside cylindrical surface adapted to slidably fit in engagement with said external cylindrical surface of said segmented nut member;
 c) a spacer member, said spacer member having a first flat end and a second flat end, said spacer member made of a shape memory alloy formulated to change its internal structure at a transition temperature, said spacer member having been processed below the transition temperature physically to increase the axial length between said first end and said second end.
 d) heater means, said heater means adapted to heat said spacer member to said transition temperature;
 e) spring means, said spring means disposed on said load ring member, said spring means being adapted to move said load ring member out of engagement with said segmented nut;
 whereby said spacer member is adapted to be assembled between said segmented nut and said structure members using said threaded element and whereby a pre-tension load is applied to said threaded element and said structure members for assembly, and whereby said load ring member is frictionally held by component thread forces in engagement with said segmented nut, whereby heating said spacer member to said transition temperature changes the length of said spacer member, whereby pre-tension load is relieved, and whereby said spring means moves said load ring out of assembly with said segmented nut.

3. A separation nut according to claim 2 which includes said load ring member having a first and a second end whereby said first end of said load ring being adjacent said first end face of said segmented nut member, said load ring member having a shoulder at said first end on said internal cylindrical surface, said external cylindrical surface of said segmented nut being reduced in diameter for a distance from said first end face of said segmented nut to form a shoulder intermediate to said first and second faces of said segmented nut whereby said spring means is engaged between said shoulder at said first end of said load ring and said shoulder on said segmented nut.

4. A separation nut according to claim 3 which includes a case body member having an internal cylindrical cavity, said cavity having a closed wall end and an open end, said cavity having a longituidinal axis of said segmented nut, said case body member having anti-rotation means between said body member and said segmented nut.

5. A separation nut according to claim 4 which includes said open end of said cavity having fixed cap means; and first and second pin means, said first pin means adapted to hold said spacer means against rotation relative to said cap means; and washer means, said washer means and said spacer means held against rotation by said second pin means, and said key washer means having up-standing key means which engage said segmented nut member for resisting rotation.

6. A separation nut according to claim 5 which includes said segmented nut member having concave surfaces forming said first and said second end face, and said key washer means having a convex surface from which said upstanding key means protrude, said convex surface being adapted to engage said second end face of said segmented nut.

7. A separation nut according to claim 6 which includes a separator shaft member slidably mounted in said case body member coaxial with said longitudinal axis of said case body member, said separator shaft member having a conical head, and compression spring means, said compression spring means being compressed between said separator shaft member and said case body member, said compression spring means urging said conical head against said concave surface of said first end face of said segmented nut.

8. A separation nut according to claim 4 in which includes indicator pin means, said indicator pin means having a shaft slidably mounted through said closed wall end of said case body member, said indicator pin means having a head within said internal cylindrical cavity of said case body member, said indicator pin displaced radially from said longitudinal axis of said case body member whereby said indicator pin head is in contact with said load ring, said indicator pin shaft moving through said closed wall end of said case body member, whereby said indicator pin shaft is made prominently visible by separation motion of said load ring.

9. A separation nut according to claim 2 which includes said spacer member formed from a flat sheet of SMA material, said SMA flat sheet of SMA material pre-rolled for imposing stress deformation in said SMA flat sheet; said heater means in the form of a flat sheet of heater material, said SMA flat sheet and said heater flat sheet rolled together in one spiral of alternating material, said material spiral forming said spacer member said spacer member having an internal axial cylindrical wall formed for passage of said threaded element.

10. A separation nut according to claim 6 which includes a separator shaft member slidably mounted in said case body member coaxial with said longitudinal axis of said case body member, said separator shaft member having a conical head; compression spring means, said compression spring means mounted about said separator shaft means, said compression spring means urging said conical head against said concave surface of said first end face of said segmented nut and simultaneously pushing said shoulder at sad first end of said load ring to push said load ring out of engagement with said segmented nut.

11. A separation nut according to claim 8 which includes a threaded boss means and threaded plate means said threaded boss means on said closed wall end of said case body member, said threaded plate means threadably assembled to said threaded boss means said threaded plate means having a surface adapted to contact said indicator pin means whereby said indicator pin means is enabled to hold said load ring means in position for assembly of said segmented nut member with said threaded element.

12. A separation nut for releasably engaging a threaded element for separation of an assembly of structural members, comprising:
   a) a case body member having an internal cavity, said cavity having a closed wall end and an open end opposite to each other, said case body member having a longitudinal axis; said case body member having a transverse key port to said cavity adjacent said closed wall end;
   b) cap means, said cap means closing said open end of said cavity, said cap means having a bore therethrough, said bore being coaxial with said longitudinal axis said case body member;
   c) stud means, said stud means made of a shape memory alloy, said stud means physically compressed in length at a temperature below the transition temperature of the shape memory alloy;
   said threaded stud means mounted through said closed wall end of said cavity coaxial with the longitudinal axis of said case body member, said stud means having a semi-tubular shank and thread means at the end of said tubular shank;
   d) segmented nut means, said segmented nut means engaged with said thread means of said stud means, said segment nut means having a smooth cylindrical surface having a reduced diameter cylindrical groove intermediate of its length forming two cylindrical shoulders from said smooth cylindrical surface;
   e) load ring means, said load ring means having an inside cylindrical diameter adapted to make a slidable fit with said segmented nut means, said inside cylindrical diameter having an increased diameter cylindrical undercut of greater length than said cylindrical shoulders of said segmented nut means, whereby said segmented nut means will expand into said load ring means upon longitudinal motion of said loading means for separation;
   f) lock pin means, said lock pin means being fixed to said cap means, said lock pin means being engaged with said segmented nut means whereby said segmented nut means is locked against rotation;
   g) heater means, said heater means being mounted on said stud means, whereby said heater means raises the temperature of said stud means to the transition temperature of said shape memory alloy;
   h) key means, said key means in said transverse key port of said case body member, said key means holding said load ring member in position around said segmented nut means with said threaded element and assembly of said structural members.

13. Apparatus according to claim 12 which includes said heating means in the form of squib means, said squib means being electrically actuable, said squib means when actuated generating chemical heat in said stud means.

14. A separation nut according to claim 12 in which said heating is an electrical resistance element means.

15. A separation nut according to claim 12 in which said case body member includes mounting means, whereby said case body member may be mounted to structural elements.

* * * * *